(12) United States Patent
Jourdan et al.

(10) Patent No.: US 7,533,247 B2
(45) Date of Patent: May 12, 2009

(54) OPERATION FRAME FILTERING, BUILDING, AND EXECUTION

(75) Inventors: Stephan Jourdan, Portland, OR (US);
Per Hammarlund, Hillsboro, OR (US);
Alexandre Farcy, Hillsboro, OR (US);
John Alan Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 11/324,143

(22) Filed: Dec. 30, 2005

(65) Prior Publication Data

US 2007/0157188 A1 Jul. 5, 2007

(51) Int. Cl.
*G06F 9/30* (2006.01)
*G06F 9/40* (2006.01)
*G06F 15/00* (2006.01)

(52) U.S. Cl. ...................................... 712/207
(58) Field of Classification Search ................... 712/207
See application file for complete search history.

(56) References Cited

U.S. PATENT DOCUMENTS 6,304,962 B1 * 10/2001 Nair ........................... 712/240
6,912,650 B2 * 6/2005 Ukai et al. ................... 712/237
7,020,766 B1 * 3/2006 Wang et al. .................. 712/227
7,437,542 B2 * 10/2008 Wang et al. .................. 712/227
2001/0027515 A1 * 10/2001 Ukai et al. ................... 712/207

OTHER PUBLICATIONS

Almog et al.; Specialized Dynamic Optimizations for High-Performance Energy-Efficient Microarchitecture; Mar. 2004; Code Generation and Optimization 2004; pp. 137-148.*
Patel et al.; rePlay: A Hardware Framework for Dynamic Optimization; Jun. 2001; IEEE Transactions on Computers, vol. 50, No. 6.*
Patel, Sanjay J., et al., "rePLay: A hardware framework for dynamic optimization", *IEEE Transactions on Computers*, 50(6), (Jun. 2001),590-608.
Patel, Sanjay J., et al., "rePLay: A Hardware Framework for Dynamic Program Optimization", *Technical Report CRHC-99-16*, University of Illinois, (Dec. 1999),1-26.

* cited by examiner

*Primary Examiner*—Eric Coleman
*Assistant Examiner*—Corey S Faherty

(57) ABSTRACT

The present subject matter relates to operation frame filtering, building, and execution. Some embodiments include identifying a frame signature, counting a number of execution occurrences of the frame signature, and building a frame of operations to execute instead of operations identified by the frame signature.

19 Claims, 4 Drawing Sheets

OPERATION FRAME FILTERING, BUILDING, AND EXECUTION

FIELD

The inventive subject mater relates to processor pipelines and, more particularly, to instruction frame filtering, building, and execution.

BACKGROUND

Increasing reliance on computers to perform greater and greater volumes of work is causing processor manufacturers to find new ways to increase processor performance. One way to increase processor performance has been to increase processor speed. Another way to increase processor performance has been to increase memory available on a processor to reduce calls to memory and storage. Despite these efforts, demands for increased processor performance remain.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limiting sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples.

Figure 1:
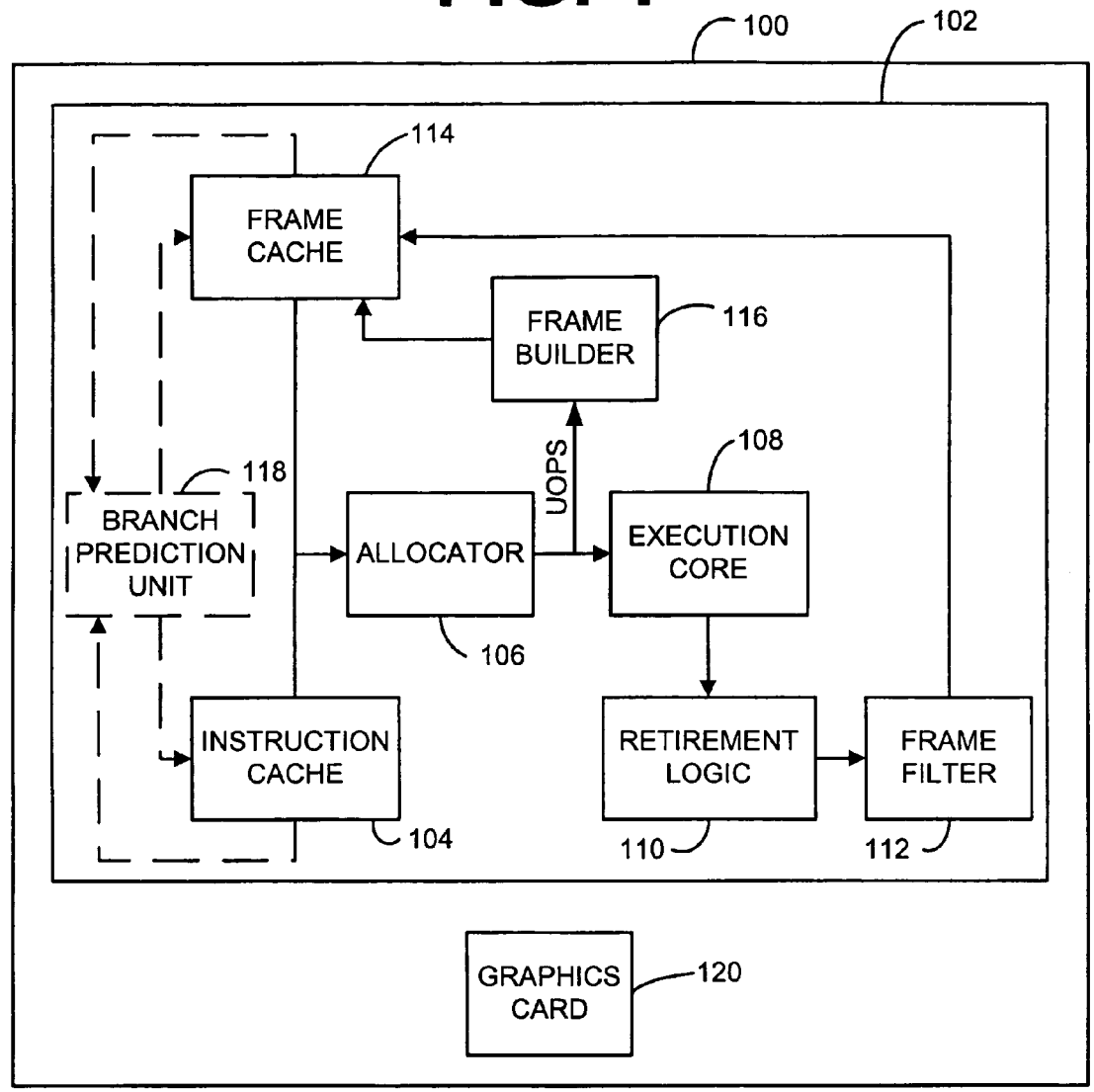
FIG. 1 is a schematic block diagram of a system according to an example embodiment.

FIG. 1 is a schematic block diagram of a system 100 according to an example embodiment. The example system 100 includes a processor 102 and a graphics card 120.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

In a pipeline micro-architecture of a processor, operation sequences are often repeated. An operation sequence, in some embodiments, originates from a computer code compiler and is decoded in a processor pipeline by an instruction decoder into a sequence of micro-operations, such as uOPS, that are sent through the pipeline for execution by an execution core, such as an out of order ("OOO") execution core. The order of the sequence of instructions is set by the computer code compiler based on factors such as optimization of the instruction sequence for a given platform type. One such platform type is a generic processor family.

Although there may be generalities within a certain processor family, individual processor types within the processor family have distinct properties that cause individual processor types to be more or less efficient in performing certain instructions or instruction sequences. Thus, although a sequence of instructions from a computer code compiler may be compiled based on a generic processor family properties, the sequence of operations resulting form the sequence of instructions can be more efficient on some individual processor types and less efficient on others. The present subject matter, in some embodiments, provides processors, processor architectures, pipelines, methods, and other items to identify frames and optimize, or otherwise alter a frame, to cause more efficient processing based on the specific properties of a processor and the dynamic behavior of software that is being executed on the processor. A frame is a sequence of operations, such as uOPS.

The graphics card 120 is operative in the system 100 to display system 100 output. In some embodiments, the graphics card 120 is a three-dimensional graphics card. In some such embodiments, the graphics card receives instructions from the processor 102 to cause information to be displayed on a monitor of the system 100.

The processor 102, in some embodiments, is a general-purpose processor. In other embodiments, the processor is an application-specific integrated circuit ("ASIC"). The processor 102 includes a pipeline. A portion of this pipeline is illustrated in FIG. 1 within the processor 102. The illustrated portions of the pipeline include an instruction cache 104, an allocator 106, an execution core 108, and retirement logic 110. The pipeline further includes a frame filter 112, a frame cache 114, and a frame builder 116. Some embodiments of the pipeline also include frame prediction integrated with a branch prediction unit 118 that also performs instruction prediction.

Instruction cache 104 in a repository for instructions to be decoded into operations, such as uOP micro-operations, and executed by the execution core 108 of the processor 102. The content of the instruction cache 104 includes instructions obtained from instructions in system 100 memory or storage. Instructions in the instruction cache 104 are decoded and forwarded on through the processor 102 pipeline to the allocator 106.

The allocator 106, among other things, dispatches operations though the pipeline to the execution core 108. The execution core 108, among other things, receives and processes operations. Output from the execution core 108 is dispatched through the pipeline to other pipeline portions including the retirement logic 110. The retirement logic 110, among other things, identifies executed operations, such as executed uOP micro-operations, and operation completion status.

The frame filter 112 identifies frames, counts occurrences of frame execution by the execution core, and provides frame signatures to the frame cache 114 to cause frames to be built when the frame cache 114 receives a later frame signature hit. The frame cache 114 identifies when a sequence of operations is to be executed that it has a frame signature for, causes frames to be built by the frame builder, and stores frames built by the frame builder. The frame builder 116 builds frames in response to an command from the frame cache 114 and operations received from the allocator 106 and stores built frames in the frame cache 114.

During operation, the frame filter 112 is responsible for identifying sequences of operations, such as uOP micro-operations, that need to be built and stored as frames into the frame cache 114. The frame filter 112 does not actually collect operations; rather it collects information about the operations that retire from the retirement logic 110, and builds signatures. For a given starting address, such as an instruction pointer, and a given stew (a global branch history), the signature uniquely defines the sequence of operations to store as a frame in the frame cache 114. In some embodiments, the signature is defined by the number of operations, such as uOPS, the direction of branches inside the frame, and other information as needed in the specific embodiment.

To construct a frame signature, the frame filter 112 needs to detect frame boundaries. Because the frame cache 114 is only looked up, as will be discussed in greater detail below, on front-end redirections and after a frame cache hit, the beginning of a frame ("BOF") is an operation immediately following a branch or a frame. The frame filter 112 identifies such operations as potential BOFs when they retire from the retirement logic 110. The frame filter 112 gathers signature information on retiring operations until an end of frame ("EOF") condition is reached. The frame filter 112 then starts building a new signature starting at the next BOF operation that retires.

The frame filter 112 follows rules to decide when to end a frame signature. A maximum number of operations per frame is one such rule, but restrictions on the maximum number of branches or memory operations within one frame can also apply. Also, in some embodiments, all the operations from an instruction have to belong to the same frame. Thus, if the retiring operation of an instruction would not fit in the current frame, the frame filter 112 ends the current signature and starts a new frame with this instruction. The last operation of the signature is marked as an end of frame (EOF).

When an EOF has been identified after a BOF by the frame filter 112, a complete frame signature has been built. The frame filter 112 writes this signature into a build filter array. The build filter array is stored in a memory resident on the processor 102. The build filter array holds built frame signatures built and is indexed and tagged by a function of an instruction pointer ("IP") and stew of the BOF. Each entry in this array carries a counter that indicates how many times that same signature has been built. If the signature just built already exists in the build filter array, then the counter for that signature is incremented. Once the counter reaches a certain threshold, the signature is promoted to the frame cache 114. Promoting the frame signature to the frame cache tells the frame cache to build a frame of operations corresponding to the frame signature the next time the sequence of operations identified by the frame signature is detected. In some embodiments, using a threshold in the Build Filter array provides a guarantee that only the most frequently executed portions of code make it to the frame cache 114.

If a different signature was already built with the same IP and stew, then the signature in the build filter array is updated to keep a shorter signature. The shorter signature corresponds to the longest common prefix of both the original signature and the shorter signature, i.e., the original signature is truncated just before the first mismatch between the signatures. This happens, for example, when a branch previously taken is now seen not taken (and vice versa). Keeping the shorter, or truncated, signature means that a flaky branch will end a frame. Subsequent frame prediction is then possible to dynamically predict the direction and target of the flaky branch. If the shortened signature is too small to be a frame, the signature is dropped from the build filter array. In some embodiments, this guarantees that only relatively long portions of code make it to the frame cache.

For a given IP, the frame filter 112 can build the same signature with different stews. To avoid building the same frame several times, the frame filter 112, in some embodiments, keeps only one instance of the signature in the build filter array, computes a stew mask to isolate the significant bits of the stews, and defines a partial match. This stew mask is stored with the signature in the build filter array. When, and if, the frame is eventually stored in the frame cache 114, the stew mask is also stored with it.

When the Frame Cache 114 is looked up with an IP and a stew, the stew mask defines which bits of the used for the frame cache lookup stew should be used in the stew match to define a frame cache hit. This allows a hit in the frame cache 114 even if the stews match only partially. This further allows the storing of the frame once even though several signatures correspond to it. The storing of the frame only once helps improve the efficiency of the frame cache 114 by limiting replication, without reducing the hit rate.

When a signature is promoted to the frame cache 114, an entry in a frame cache 114 tag array is allocated for the frame and the signature is stored in this entry with an indication that this frame is ready to be built. At fetch time, a hit on this "to build" entry triggers the actual build of the frame by the frame builder 116; but instructions are still provided by the instruction cache. However, the signature read from the frame cache 114 contains the information needed by the frame builder to identify the first and last operations, the BOF and the EOF, of the frame to build. In some embodiments, the frame signature is inserted before the first instruction provided by the instruction cache as a "build marker" for the frame builder 116. The frame builder 116 collects those operations from BOF to EOF when they reach the allocator 106 and builds the actual frame.

The frame builder 116 can perform any number of actions with frame operations. Some such actions include applying any number of optimizations on this sequence of operations, such as dead code elimination, or any compiler-like type of optimization. When the frame builder 116 is finished, the frame is stored in the frame cache 114 and the entry that was marked "to build" is now marked "built" so that subsequent hits to this frame cache 114 entry causes the frame cache 114 to deliver the actual frame. In such an instance, when the frame cache 114 delivers a frame, the instruction cache 104 does not need to deliver instructions and the instructions do not need to be decoded into uOPS.

In some embodiments, the frame cache 114 stores frame data in two or more arrays. These arrays include a tag array and a data array. Each entry of the frame cache 114 tag array can hold a frame signature, an instruction pointer of a first line of a cached operation sequence in the data array, and the stew for the frame signature, and the frame state as further described with reference to FIG. 2.

The data array includes two additional arrays. These arrays include a link array and an operation array. The link array provides a link from the end of operation array lines to the start of a next operation array line. In some embodiments, the link array provides an identification of all lines forming a frame. In such embodiments, the line identifications are stored as a linked list within the link array. The frame cache 114 data array stores frames as a multiple lines of operations. In some embodiments, the length of an operation array line is the width of the execution core 108. In some embodiments, the link array and the operation array are not within the data array, but instead are arrays on the same level as the tag array. In such embodiments, the frame cache 114 stores frame data in three arrays.

Some embodiments also integrate the branch prediction unit 118 in the frame-based micro-architecture. As described above, the frame cache 114 data array stores and delivers sequences of operations called frames, while the frame cache 114 tag array contains the entry points to the frame cache. This tag array is indexed with the IP of the next instruction to fetch, and tagged with the IP as well as the stew. A stew mask defines which bits of the stew to ignore, allowing a frame cache 114 hit, even when the stews match only partially.

In some embodiments, when an entry is hit in the frame cache 114 tag array, several things are read out. For example:
  An identifier of a first portion of the frame indicates to the frame cache 114 data array which frame to actually deliver.
  The stew update indicates how to update the current stew so that it matches the stew of the last instruction of the frame.
  The end-IP is the IP of the last instruction of the frame.
  The prediction bit indicates if the target of the frame should be predicted or not, i.e., whether the last instruction of the frame is a conditional or indirect branch.
  The target-IP is the IP of the next instruction following the frame (either fall-through or the target of an unconditional direct branch), and is valid if the prediction bit is not set.

After a hit in the tag array on a "built" frame, a frame identifier is sent to the frame cache 114 linkage array, so that the actual operations of the frame can be delivered to the execution core 108. At the same time, the instructions following that frame need to be fetched. Those instructions may or may not have been built into a frame, and both the frame cache 114 and the instruction cache 104 need to be looked up. The stew is updated with the stew update provided by the frame cache 114 tag array, and the control flow is redirected to the target-LIP of the frame. If the prediction bit is not set, then the frame cache 114 and the instruction cache 104 are looked up with this target IP.

If the prediction bit for the frame is set, then the target-IP provided by the frame cache 114 tag array is invalid, and the branch prediction unit 118 needs to provide the target IP of that frame. The branch prediction unit 118 is looked up with the updated stew and the end-IP provided by the frame cache 114 tag array. Then the predicted target provided by the branch prediction unit 118 is used to lookup the frame cache 114 and the instruction cache 104.

This frame cache 114 embodiment allows unification of the predictor for frames from the frame cache 114 and the predictor for instructions from the instruction cache 104 as it relies on the same branch prediction unit 118 to provide predictions for branch as well as frame targets. This embodiment also allows use of the same indexing scheme to the branch prediction unit 118 for both a frame or an instruction prediction.

Figure 2:
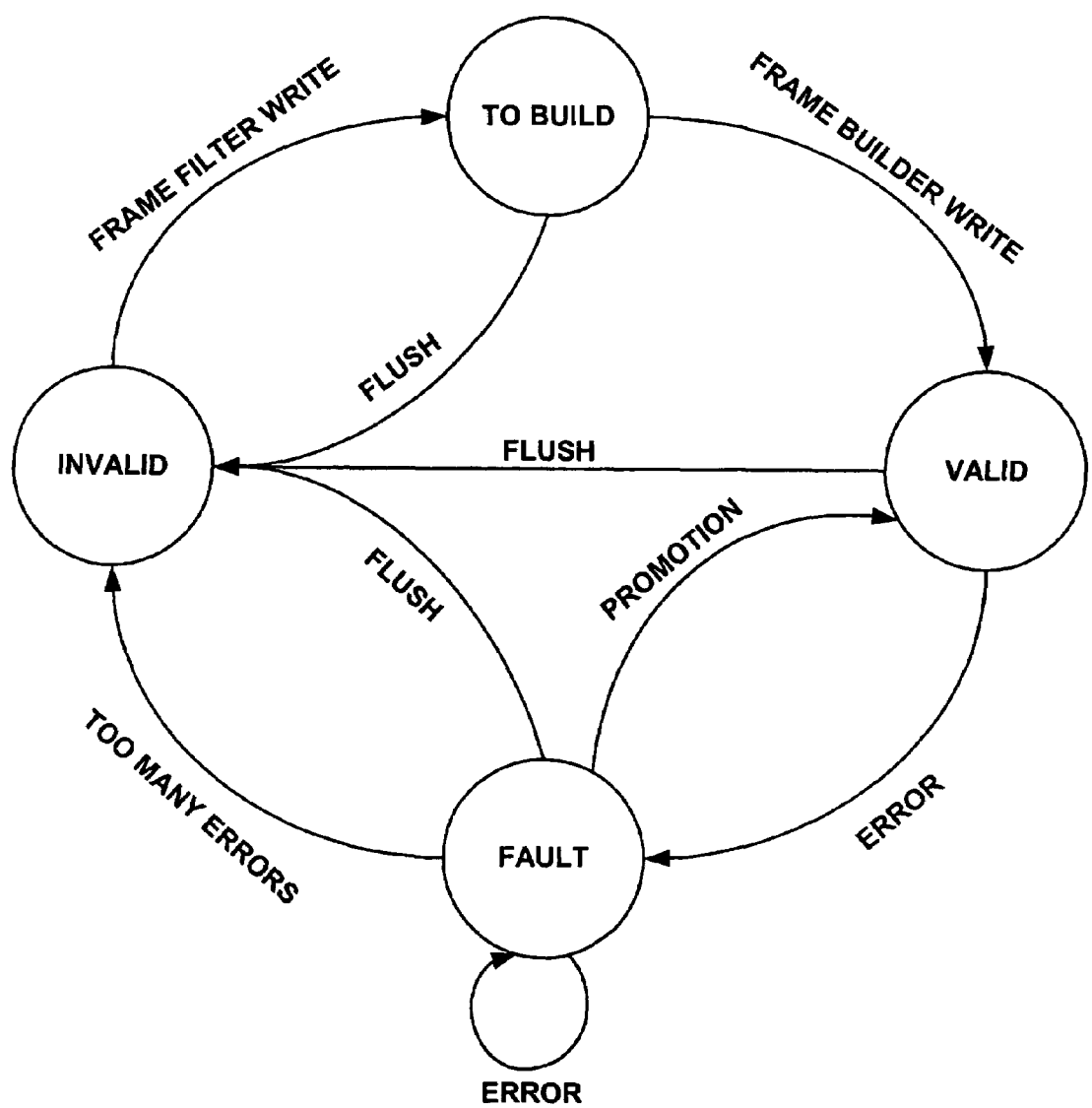
FIG. 2 is a state diagram of frame states in a frame cache according to an example embodiment.

FIG. 2 is a state diagram 200 of frame states in a frame cache 114 according to an example embodiment. The frame states are identified in the state diagram as circles. The frame states include "TO BUILD," "VALID," "FAULT," and "INVALID."

In this example embodiment, with simultaneous reference to FIG. 1, a starting state of a frame in the frame cache 114 is "TO BUILD." This state occurs when a frame signature has been allocated into the frame cache 114 by the frame filter 112, but a frame has not yet been built for the frame signature. When a "TO BUILD" state is hit in the frame cache 114 tag array, the frame cache tag array entry is locked and a build marker is injected down the pipeline as a special instruction. In some embodiments, the build marker holds the signature provided by the frame cache 114 tag array. When the build marker gets to the allocator 106, the special instruction causes the frame builder 116 to start collecting operations. The frame builder 116 collects a number of operations, such as uOPS, identified in the frame signature. In some embodiments, the frame builder 116 can also check that the branch predictions correspond to the signature. If the operations collected are not the ones expected, then the frame builder 116 can decide to not build this frame.

The frame builder 116 sends a busy signal to the frame cache 114 tag array to force subsequent built hits to be ignored. Any new build markers going through the pipeline are then ignored by the frame builder 116. When the frame builder 116 is finished building the frame, it writes the operations of the signature to the frame cache 114 data array in lines linked together in a linked list stored in the link array. In some embodiments, the lines are six operations in length where the execution core 108 can process six operations per cycle. Also, in some embodiments, the frame builder 116 updates the frame cache 114 tag array with data including the frame length, end-IP, branch bit, and stew update which provides the information necessary to recompute the stew at the end of the frame. The frame builder 116 then marks the frame cache 114 tag array entry as "VALID."

If, after a frame is built and marked valid, an error is detected in the frame during execution, the frame status is changed in the frame cache 114 tag array to "FAULT." If the error is not detected again after on a subsequent execution of the frame, the status is promoted back to "VALID." However, if after a number of executions of the frame, the frame execution continues to result in errors, the frame is marked "INVALID" and will be flushed from the arrays of frame cache 114. The space previously occupied by flushed frames is then reclaimed and is available for use by a new frame.

After a certain period of time, or after a corresponding instruction sequence from the instruction set is evicted from the instruction cache 104, a frame in the frame cache 114 can be evicted regardless of the frame status. This clears the frame cache 114 of frames that are not likely to be hit again.

Figure 3:
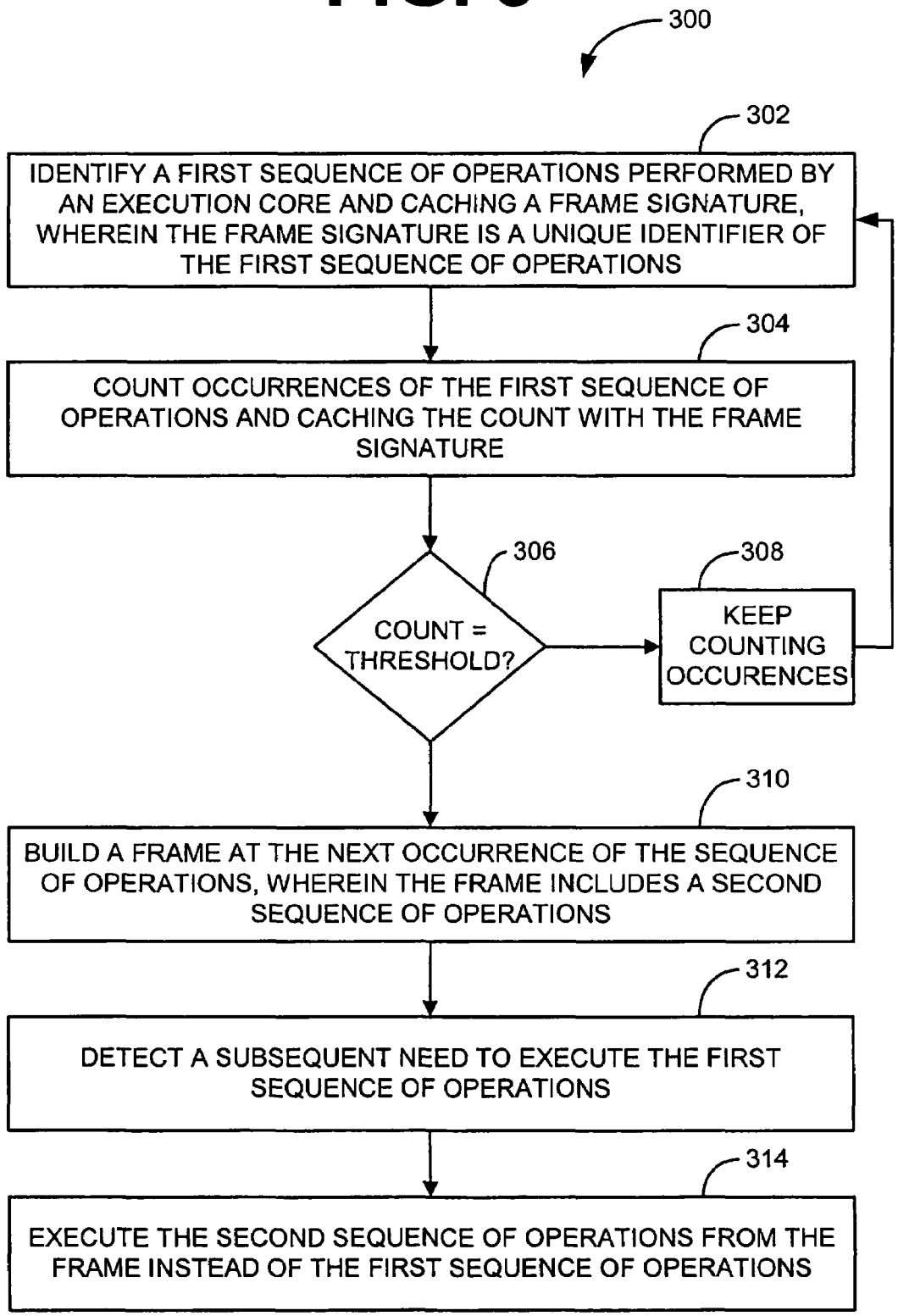
FIG. 3 is a block diagram of a method according to an example embodiment.

FIG. 3 is a block diagram of a method 300 according to an example embodiment. The example method 300 includes identifying a first sequence of instructions operations by an execution core and caching a frame signature, wherein the frame signature is a unique identifier of the first sequence of operations 302 and counting occurrences of the first sequence of operations and caching the count with the frame signature 304.

The example method 300 further includes determining whether the count reaches a threshold 306. If the count threshold is not reached, the method 300 keeps counting occurrences 308. If the count threshold is reached, the method 300 builds a frame at the next occurrence of the sequence of operations, wherein the frame includes a second sequence of operations 310.

The example method 300 further includes detecting a subsequent need to execute the first sequence of operations 312 and executing the second sequence of operations from the frame instead of the first sequence of operations 314.

In some embodiments, building a frame includes building the second sequence of operations as a function of the first sequence of instructions. In such embodiments, the second sequence of instructions causes the execution core to produce the same results as the first sequence of operations would have produced. In yet further embodiments of the method 300, the second sequence of operations includes the operations of the first sequence of operations reorganized to optimize execution core performance. This can include a smaller number of operations than the first sequence of operation.

Some embodiments of the method 300 further include storing the frame in a frame cache including at least two arrays. In some such embodiments, the first array includes the frame signature and a second array pointer pointing to a storage location of the second sequence of operations. The second array includes the second sequence of operations. In some such embodiments, the second array includes a data linkage array providing links from line ends of second operation sequence lines in a data array to a start of a next line of the second operation sequence, and the data array including the second sequence of operations stored in a plurality of lines.

Figure 4:
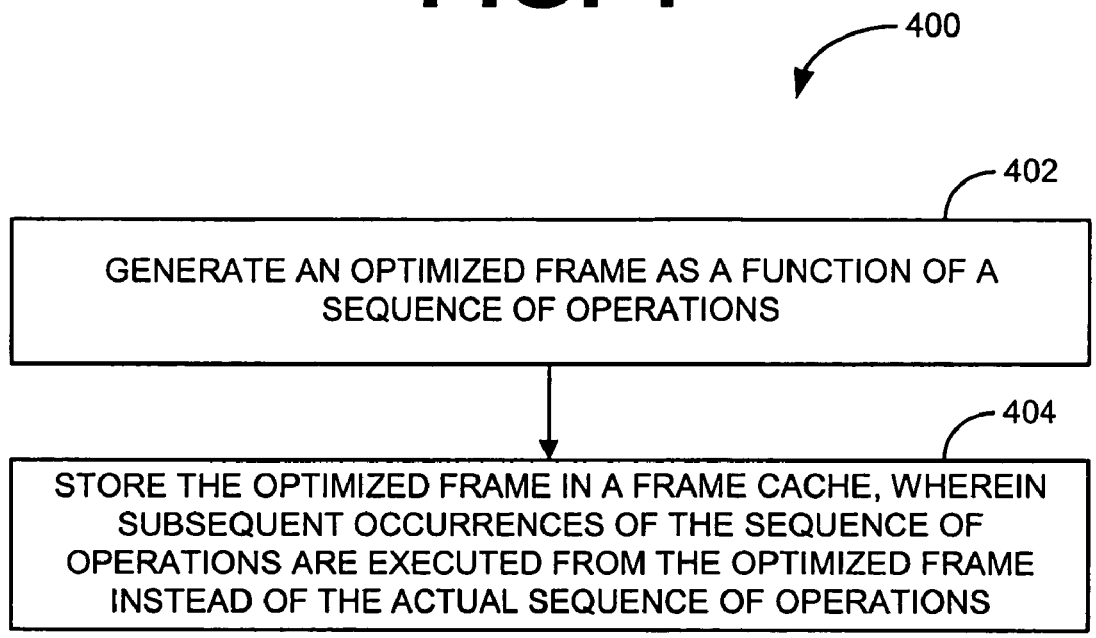
FIG. 4 is a block diagram of a method according to an example embodiment.

FIG. 4 is a block diagram of a method 400 according to an example embodiment. The example method 400 includes generating an optimized frame as a function of a sequence of operations 402 and storing the optimized frame in a frame cache, wherein subsequent occurrences of the sequence of operations are executed from the optimized frame instead of the actual sequence of operations 404.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
   identifying a first sequence of instructions operations by an execution core and caching a frame signature, wherein the frame signature is a unique identifier of the first sequence of operations;
   counting occurrences of the first sequence of operations and caching the count with the frame signature;
   if the count reaches a threshold, building a frame at the next occurrence of the sequence of operations, wherein the frame includes a second sequence of operations;
   storing the frame in a frame cache including two distinct arrays, wherein:
      a first array includes the frame signature and a second array pointer wherein the second array pointer points to a storage location of the second sequence of operations, and
      the second array includes two arrays including:
         a data linkage array providing links from line ends of second operation sequence lines in a data array to a start of a next line of the second operation sequence, and
         the data array including the second sequence of operations stored in a plurality of lines;
   detecting a subsequent need to execute the first sequence of operations; and
   executing the second sequence of operations from the frame cache instead of the first sequence of operations.

2. The method of claim 1, wherein building a frame includes:
   building the second sequence of operations as a function of the first sequence of instructions, wherein the second sequence of instructions causes the execution core to produce a same result as the first sequence of operations would have produced.

3. The method of claim 1, wherein the second sequence of operations includes the operations of the first sequence of operations reorganized to optimize execution core performance.

4. The method of claim 1, wherein the second sequence of operations includes a smaller number of operations than the first sequence of operations, wherein the second sequence of operations, when executed, produce the same result as the first sequence of operations.

5. The method of claim 1, wherein the first and second sequences of operations are sequences of uOP micro-operations.

6. The method of claim 1, wherein a length of data array lines is matched to the width of the execution core.

7. The method of claim 6, wherein the data array line length is the width of six uOP micro-operations.

8. A hardware processor comprising:
   a pipeline including:
      a frame filter that receives output from pipeline retirement logic;
      a frame cache that provides a cached operation sequence to the pipeline; and
      a frame builder that can receive a copy of an operation sequence sent to an execution core, optimize the copy of the operation sequence, and store the optimized copy of the operation sequence to the frame cache as the cached operation sequence, wherein the cached operation sequence is a frame;
   wherein the frame filter:
      identifies sequences of operations executed by the execution core and received from the pipeline retirement logic;
      caches a frame signature for each sequence of operations, wherein the frame signature is a unique identifier of a sequence of operations;
      counts occurrences of each sequence of operations and caches the count with the corresponding frame signature; and
         if the count reaches a threshold for a given sequence of operations, the frame filter sends a command and a signature of the given sequence of operations to the frame cache to cause a frame to be built upon the next occurrence of the given sequence of operations; and wherein the frame cache includes:
- a tag array, wherein the tag array has lines including a frame signature and an address of a first line of a cached operation sequence in a data array;
- the data array, wherein the data array is a separate array from the tag array, the data array including a linkage array and a data array including operation lines, wherein the linkage array provides a link from a data array line end to a start of another data array line.

9. The hardware processor of claim 8, wherein the width of a data array operation line is a width of the execution core.

10. The hardware processor of claim 8, wherein the frame cache, upon request for an operation sequence for which it has a signature stored, determines if a frame has been built by the frame builder for the operation sequence, wherein:
- if the frame has been built, the frame cache provides an operation sequence of the frame; and,
- if the frame has not been built, the frame cache issues an operation which causes the frame builder to copy a sequence of operations flowing through the pipeline before the sequence operations reaches the execution core.

11. The hardware processor of claim 8, wherein the execution core is an out-of-order execution core.

12. The hardware processor of claim 8, wherein a sequence of operations comprises a sequence of uOP micro-operations.

13. The hardware processor of claim 8, further comprising:
- a prediction unit, wherein the prediction unit receives input comprising input from an instruction cache and the frame cache.

14. The hardware processor of claim 13, wherein the prediction unit is a branch prediction unit.

15. A system comprising:
- a hardware processor including a frame cache to provide an output in response to a request for an operation sequence, wherein the output in response to the request for the operation sequence is:
  - a cached operation sequence if the cached operation sequence is available,
  - a command to cause a frame to be built by another processor portion and stored in the frame cache, or
  - an indication that the frame cache does not have any information regarding the requested operation sequence; and
- a graphics card operative in the system; and
- wherein the frame cache includes:
  - a tag array, wherein the tag array has lines including a frame signature and an address of a first line of a cached operation sequence in a data array;
  - the data array, wherein the data array is a separate array from the tag array, the data array including a linkage array and a data array including operation lines, wherein the linkage array provides a link from a data array line end to a start of another data array line.

16. The system of claim 15, wherein the command to cause a frame to be built by another processor portion causes a frame builder to copy an operation sequence sent to an execution core of the processor and store the copy of the operation sequence to the frame cache.

17. The system of claim 16, wherein the frame builder, prior to storing the copy of the operation sequence to the frame cache, modifies the copy of the operation sequence.

18. The system of claim 15, wherein a sequence of operations includes one or more processor micro-operations.

19. The system of claim 15, wherein the hardware processor further includes:
- a prediction unit that can receive input from an instruction cache and from the frame cache.

* * * * *